US012769476B2

(12) United States Patent
Ballaki et al.

(10) Patent No.: US 12,769,476 B2
(45) Date of Patent: Oct. 20, 2026

(54) DATA OBJECT-BASED STORAGE CONTROLLERS FOR MANAGING POOLS OF STORAGE

(71) Applicant: Avago Technologies International Sales Pte. Limited, Singapore (SG)

(72) Inventors: Suraj Chandra Shekar Ballaki, Bangalore (IN); Ramakrishna Rajaram, Bangalore (IN)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 18/890,685

(22) Filed: Sep. 19, 2024

(65) Prior Publication Data

US 2026/0079638 A1 Mar. 19, 2026

(51) Int. Cl.
*G06F 3/06* (2006.01)

(52) U.S. Cl.
CPC .......... *G06F 3/0655* (2013.01); *G06F 3/0604* (2013.01); *G06F 3/0644* (2013.01); *G06F 3/0679* (2013.01)

(58) Field of Classification Search
CPC .... G06F 3/0655; G06F 3/0604; G06F 3/0644; G06F 3/0679; G06F 2212/7201; G06F 12/023; G06F 3/0683
See application file for complete search history.

(56) References Cited

U.S. PATENT DOCUMENTS

| | | | |
|---|---|---|---|
| 11,112,971 B2 | 9/2021 | Satoyama et al. | |
| 11,966,841 B2 | 4/2024 | Margaglia et al. | |
| 2017/0300262 A1* | 10/2017 | Chen | G06F 3/0604 |
| 2019/0171365 A1 | 6/2019 | Power et al. | |
| 2020/0081640 A1 | 3/2020 | Enz et al. | |
| 2021/0311631 A1 | 10/2021 | Knauft et al. | |
| 2021/0311767 A1* | 10/2021 | Oh | G06F 3/0644 |
| 2022/0229604 A1 | 7/2022 | Black et al. | |

(Continued)

FOREIGN PATENT DOCUMENTS

| | | |
|---|---|---|
| JP | 2019-79113 A | 5/2019 |
| KR | 10-1663437 B1 | 10/2016 |
| WO | 2014/031799 A1 | 2/2024 |

OTHER PUBLICATIONS

Manjunatha, T. "Shared Storage Pool Management with HMC," IBM TechXchange Conference, Jun. 10, 2020, 15 pages, URL: https://community.ibm.com/community/user/power/blogs/manjunatha-thejaswi-manjunatha1/2020/06/10/ssp-mgmt-hmc-ui.

(Continued)

*Primary Examiner* — Jane W Benner
(74) *Attorney, Agent, or Firm* — Kim & Stewart LLP

(57) ABSTRACT

An example computing system includes a hardware platform including a central processing unit (CPU), volatile memory, storage devices, and a storage controller; software, executing on the hardware platform, the software configured to: discover, by the storage controller, the storage devices; create, by the storage controller, pools of the storage devices; obtain, by first software executing on the CPU, information describing the pools; determine, by the first software in cooperation with the storage controller, an address space for each of the pools; and communicating, from the software to the storage controller, a storage transaction referencing a first pool of the pools and a first address in the address space for the first pool.

20 Claims, 6 Drawing Sheets

(56) References Cited

U.S. PATENT DOCUMENTS

| | | | | |
|---|---|---|---|---|
| 2023/0229324 | A1* | 7/2023 | Zhou ..................... | G06F 3/0673 711/111 |
| 2023/0325279 | A1 | 10/2023 | Gole et al. | |
| 2023/0393735 | A1 | 12/2023 | Kesavan et al. | |
| 2024/0039996 | A1 | 2/2024 | Hrischuk et al. | |

OTHER PUBLICATIONS

Extended European Search Report mailed Feb. 10, 2026 in European Patent Application No. 25201433.7, 10 pages.

* cited by examiner

DATA OBJECT-BASED STORAGE CONTROLLERS FOR MANAGING POOLS OF STORAGE

BACKGROUND

Artificial intelligence (AI) may be focused on creating systems or machines that can perform tasks typically requiring human intelligence. For example, machine learning (ML) may be a subset of AI where systems learn from data and improve their performance over time without being explicitly programmed. AI systems can involve data processing and taking actions based on incoming data. In some cases, AI-based data processing can be performed using custom application specific integrated circuits (ASICs), field programmable gate arrays (FPGAs), graphics processing units (GPUs), as well as software executing on central processing units (CPUs). Such systems can include a large amount of volatile storage, such as random-access memory (RAM), to store transient data for quick access. Such volatile storage can be the primary storage in the system. Over time, however, as the amount of data processed grows, such systems can have a need for secondary storage, such as non-volatile storage, to reduce costs. Secondary storage can include, for example, non-volatile storage such as solid-state drives (SSDs), hard drives, and the like. The secondary storage can be less performant than the primary storage but can also have larger capacity and reduced cost compared to primary storage. In addition, if there would be option to store and move the data across different secondary storage devices, based on performance/speed of the devices, then the AI system could benefit to optimize various storage spaces based on the AI system's speed of access needs at various stage of the data processing.

A system, such as a computer, can include an input/output (IO) controller to provide an interface (referred to as a storage interface) between software and non-volatile storage devices (also referred to herein as a storage controller). A storage controller can support conventional storage interfaces, such as message passing interface (MPI), non-volatile memory express (NVMe), small computer system interface (SCSI), and the like. Software executing on the computer, such as an operating system (OS) or applications, can perform various functions for a storage interface, such as command routing and management, error handling, queue management, device discovery and initialization, data transfer management, and the like. Moreover the software can perform those functions for several different storage interfaces. It can be advantageous for a system, such as an AI-based system, to reduce complexity of managing storage interfaces to non-volatile storage devices.

SUMMARY

In an embodiment, a method of managing input/output (IO) between software and a storage controller in a computing system is described. The method can include discovering, by the storage controller, storage devices in the computing system. The method can include creating, by the storage controller, pools of the storage devices. The method can include obtaining, by the software, information describing the pools. The method can include determining, by the software in cooperation with the storage controller, an address space for each of the pools. The method can include communicating, from the software to the storage controller, a storage transaction referencing a first pool of the pools and a first address in the address space for the first pool.

Further embodiments include a non-transitory computer-readable storage medium comprising instructions that cause a computer system to carry out the above method, as well as a computer system configured to carry out the above method.

DETAILED DESCRIPTION

Figure 1:
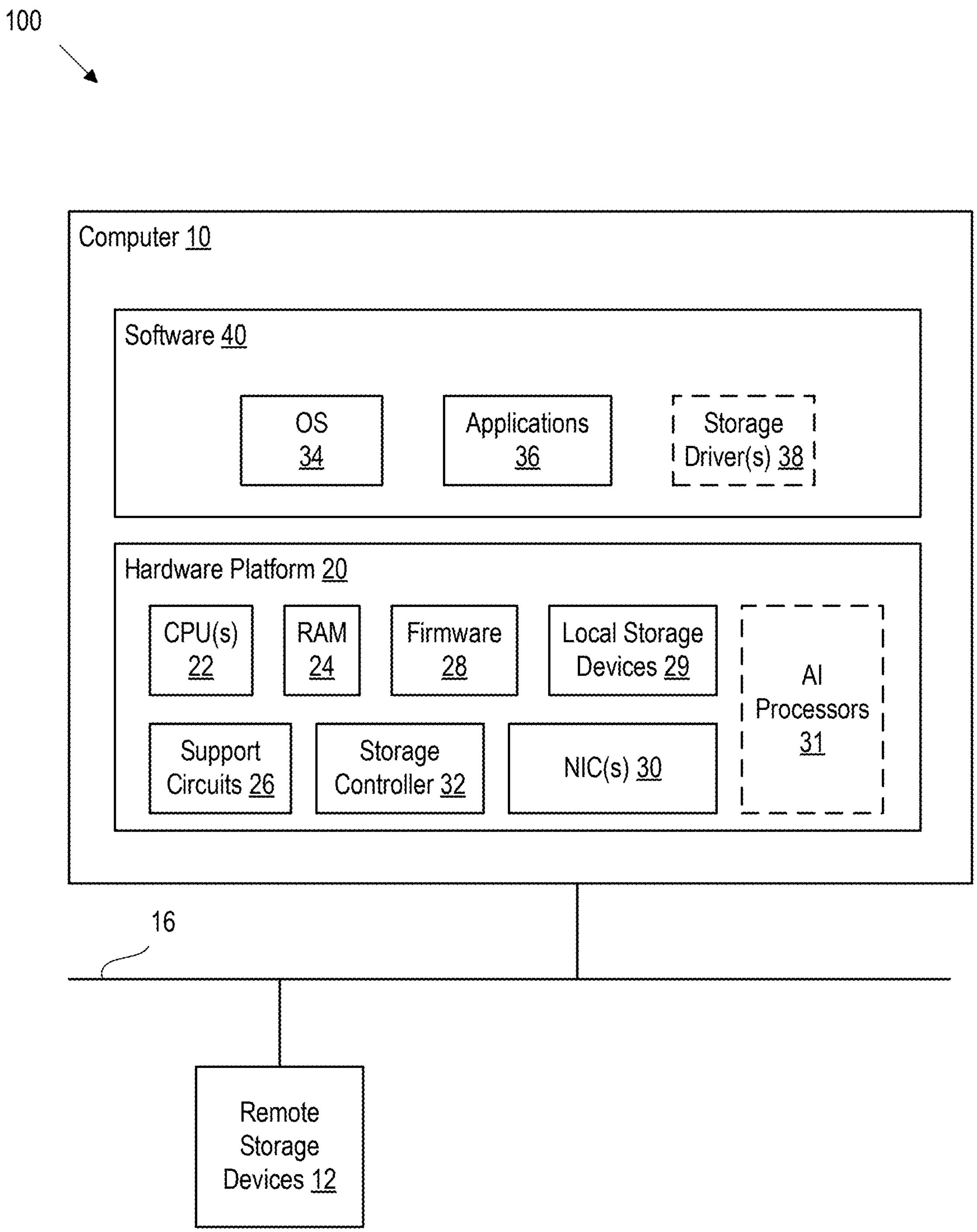
FIG. 1 is a block diagram depicting a computing system according to some embodiments.

FIG. 1 is a block diagram depicting a computing system 100 according to some embodiments. Computing system 100 includes a computer 10. A computer may be any device for storing and processing data. Computer 10 comprises software 40 executing on a hardware platform 20. A hardware platform may be devices, circuits, and the like of a computer. Hardware platform 20 includes conventional components of a computing device, such as one or more central processing units (CPUs) 22, volatile memory (e.g., random-access memory (RAM) 24), one or more network interface controllers (NICs) 30, firmware 28, support circuits 26, local storage devices 29, and storage controller 32. CPUs 22 are configured to execute instructions, for example, executable instructions that perform one or more operations described herein, which may be stored in RAM 24. Volatile memory may be any type of memory circuit that requires power to maintain the stored information (e.g., RAM 24). Firmware may be a type of software that is embedded in device(s) of hardware platform 20. For example, firmware 28 can provide low-level control for device(s) of hardware platform. Firmware 28 can be stored in a non-volatile memory (e.g., read-only memory (ROM), erasable programmable ROM (EPROM), FLASH memory, etc.). Non-volatile memory may be any type of memory circuit that retains data even when the power is turned off or disconnected. A storage device may be a device that stores data persistently. Storage devices can include non-volatile storage, such as magnetic disks (e.g., hard drives), solid-state storage (e.g., solid-state disks (SSDs), NVMe devices, etc.), and the like as well as combinations thereof. Local storage devices 29 may be storage devices in hardware platform 20. Non-volatile storage may be any type of storage device that retains data even when the power is turned off or disconnected. Non-volatile memory can be a type of non-volatile storage. In some contexts, volatile memory can be referred to as "primary storage" and non-volatile storage can be referred to as "secondary storage."

NICs 30 enable computer 10 to communicate with other devices using network protocols (e.g., Ethernet, Transmission Control Protocol/Internet Protocol (TCP/IP), etc.). NIC(s) 30 can be connected to a network 16. Network 16 comprises cabling, backplane interconnect, and the like for connecting devices. Support circuits 26 include various circuits that facilitate operation of hardware platform 20, such as power supplies, chipsets, input/output (IO) circuits, and the like. A storage controller may be a device that provides an interface between software and storage devices. Storage controller 32 may be a device that facilitates data flow between software 40 and local storage devices 29. In some embodiments, storage controller 32 can also interface with remote storage devices 12 over network 16. In some embodiments, hardware platform 20 can include one or more AI processors 31, such as ASICs, FPGAs, GPUs, or the like. An AI processor may be any type of processor that performs AI operations.

Software may be instructions executable by a processor. Software 40 can include an operating system (OS) 34 and applications 36, as well as any firmware in hardware platform 20. OS 34 can be any commodity OS known in the art or any hypervisor known in the art. A hypervisor abstracts processor, memory, storage, and network resources of hardware platform 20 to provide a virtual machine execution space within which multiple virtual machines (VMs) may be concurrently instantiated and executed. Applications 36 can be any software executing on hardware platform 20. Applications 36 can be managed by OS 34. In embodiments, OS 34, applications 36, or both can include functionality for interfacing with storage controller 32, as described further herein. In other embodiments, software 40 can include storage driver(s) 38, which can be software that includes the functionality for interfacing with storage controller 32. In such case, applications 36 or OS 34 can use storage driver(s) 38 to exchange data with storage controller 32.

Figure 2:
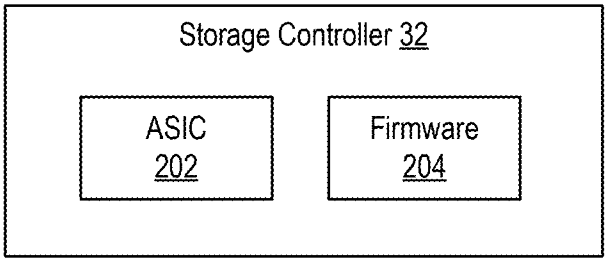
FIG. 2 is a block diagram depicting a storage controller according to some embodiments.

FIG. 2 is a block diagram depicting storage controller 32 according to some embodiments. Storage controller 32 can include an ASIC 202 and firmware 204. The functions performed by storage controller 32 described herein can be performed in hardware (e.g., using circuits in ASIC 202), software (e.g., firmware 204), or a combination of hardware and software. ASIC 202 can include an embedded processor configured to execute firmware 204 in embodiments where functions are performed using software. Storage controller 32, ASIC 202, or both can include volatile memory (e.g., RAM) for storing data, instructions of firmware 204, or both.

Figure 3:
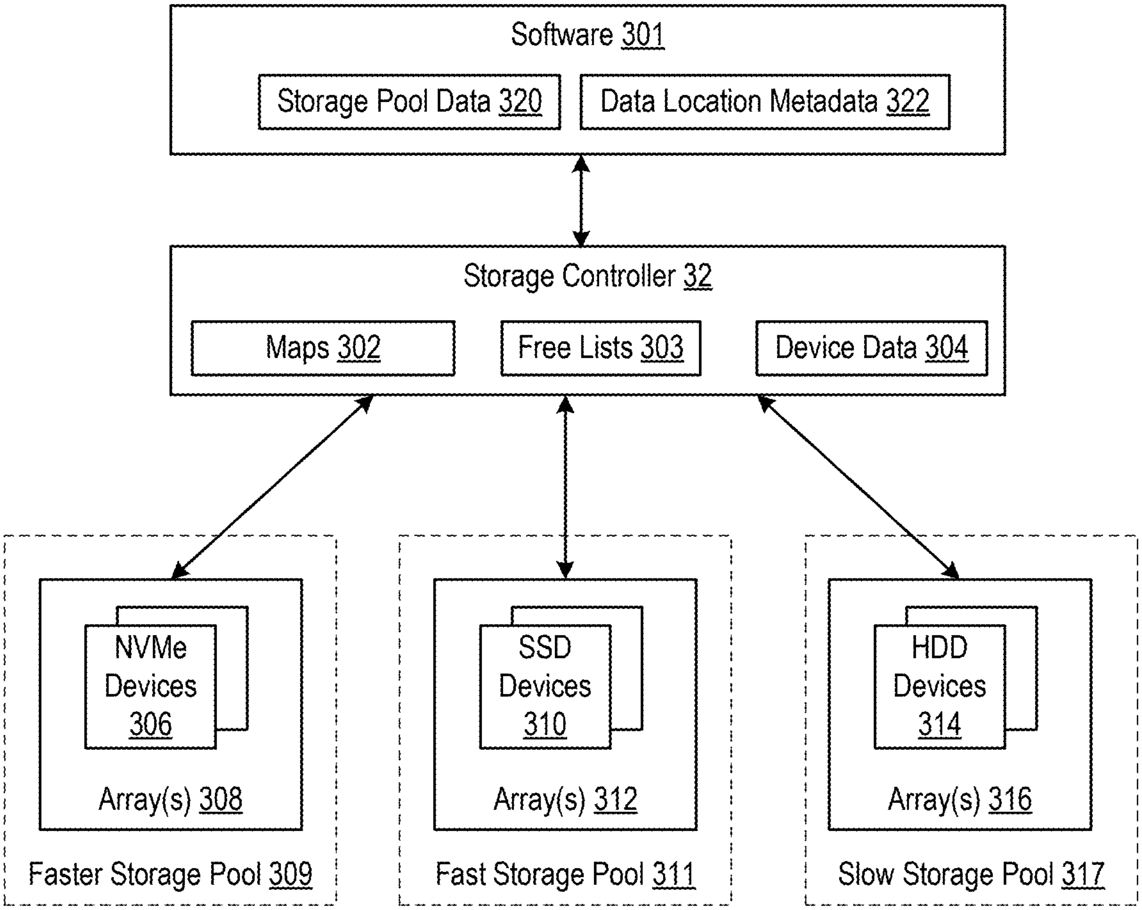
FIG. 3 is a block diagram depicting a logical system of software and a storage controller according to some embodiments.

FIG. 3 is a block diagram depicting a logical system of software 301 and storage controller 32 according to some embodiments. Software 301 can be any of OS 34, applications 36, and storage drivers 38 (e.g., any software executing on CPU(s) 22). A user or software can define storage pools at storage controller 32. A storage pool (sometimes referred to as a pool) may be storage backed by storage devices. A storage device or array of storage devices can back a pool by contributing storage to the pool. In embodiments, the storage pools can be organized based on performance of underlying storage devices. In the example, storage controller 32 can define three storage pools referred to as "faster," "fast," and "slow." A storage pool may be a collection of storage devices. In an embodiment, a storage pool is backed by an array of storage devices. An array (or disk array) may be multiple storage devices organized into a single entity.

In the embodiment, an array 308 can include NVMe devices 306. An array 312 can include SSD devices 310 (e.g., SSDs other than NVMe devices, such as serial-attached-SCSI (SAS) SSDs). An array 316 can include hard disk drives (HDDs) 314. Any type of array can be formed. For example, one or more of the arrays each can be a Raid-0 array (where Raid stands for redundant array of independent disks). A Raid-0 array may be a disk array that uses disk striping when storing data, as is known in the art. In another example, one or more of the arrays each can be a Raid-1 array. A Raid-1 array may be a disk array that uses disk mirroring when storing data, as is known in the art. In another example, one or more of the arrays each can be a Raid-5 array. A Raid-5 array may be a disk array that uses disk striping with parity, as is known in the art. One or more of the arrays can be a non-raid array, such as a JBOD array (where JBOD stands for "just a bunch of disks"). A faster storage pool 309 can include one or more arrays 308. A fast storage pool 311 can include one or more arrays 312. A slow storage pool 317 can include one or more arrays 316.

Storage controller 32 can maintain device data 304 related to the storage devices. Device data 304 can include an enumeration of the attached storage devices and an enumeration of the arrays and constituent devices. Storage controller 32 can encapsulate device data 304 such that device data 304 is not exposed to software 301. Rather, storage controller 32 can expose to software 301 the different storage pools that have been organized (e.g., faster storage pool 309, fast storage pool 311, and slow storage 317). Software 301 can communicate with storage controller 32 to obtain storage pool data 320. Storage pool data 320 can list the different storage pools (e.g., faster, fast, slow) and the sizes of each pool (e.g., in terms of bytes).

In embodiments, software 301 can communicate with storage controller 32 to configure a standard data size (e.g., 16 kilobytes (KB)) for each IO transaction (e.g., writes and reads). Embodiments are described below assuming a standard size has been defined. Embodiments where a standard size is undefined are described thereafter.

In embodiments, software 301 can communicate with storage controller 32 to configure an address space for each storage pool based on the standard size (also referred to as a "pool address space"). An address space can be a set of addresses. An address space for a pool may be divided into addresses (also referred to as "data indices") based on the standard size. For example, if a storage pool has a size of one gigabyte (GB), then 1 GB/16 KB=65,536 data indices in the pool address space. The data indices can be part of a linear addressing scheme for the pool address space, where each data index can be specified by an integer (e.g., data index 0 through data index 65,535 in the above example). Software 301 can maintain data location metadata 322 for data objects stored in secondary storage. Data location metadata 322 may relate data objects to respective addresses in the pool address spaces of the storage pools. For example, for each data object, data location metadata 322 can specify locations in the storage pools in terms of the duet (storage pool, data index).

Storage controller 32 can maintain maps 302. A map 302 may relate a pool address space to an address space of the secondary storage, e.g., an address space of the storage devices (also referred to as a "storage device address space"). The storage device address space can be divided into addresses specified by the duet (device handle, logical block address (LBA)). Device handle may be an identifier of a storage device or an array of storage devices. An LBA can specify a block of storage on a storage device or in an array of storage devices. For example, for a first index in a first storage pool, a map 302 for the first storage pool can specify a relation:

first index→(device handle, LBA).

A map 302 can include any number of such entries for any number of data indices in the corresponding pool address space. Storage controller 32 can maintain a map 302 for each storage pool (e.g., three maps respectively for storage pools 309, 311, and 317).

Storage controller 32 can also maintain a free list 303 for each storage pool. A free list 303 can specify which addresses in the storage device address space are free for a given storage pool. Storage controller 32 can maintain a free list 303 for each storage pool that is defined.

The embodiments above assumed definition of a standard data size. In other embodiments, a standard data size is left undefined. In such case, a pool address space can be divided into addresses based on some unit of size (e.g., 4 KB or some multiple of 4 KB). Software 301 can maintain data location metadata 322 as above, but the locations in the storage pools for a data object can be specified in terms of the tuple (storage pool, data index, size), where size indicates the size in bytes or the size in number of units. In addition, a map 302 for a first storage pool can specify the following for a first data index:

first index→(device handle, LBA, number of sectors), where "number of sectors" indicates the size based on sector size of the underlying storage.

Software 301 can communicate with storage controller 32 to send a storage transaction. A storage transaction may be a request for the storage controller to perform some operation on a pool. Example operations for a storage transaction include writing a data object to a pool, reading a data object from a pool, and moving a data object from one pool to another pool. A storage transaction can reference a pool and an address in the address space of a pool (e.g., when writing a data object to a pool or reading a data object from a pool). A storage transaction can reference multiple pools and addresses in address spaces of the pools (e.g., when moving a data object from an address in the address space of a source pool to an address in the address space of a destination pool).

Figure 4:
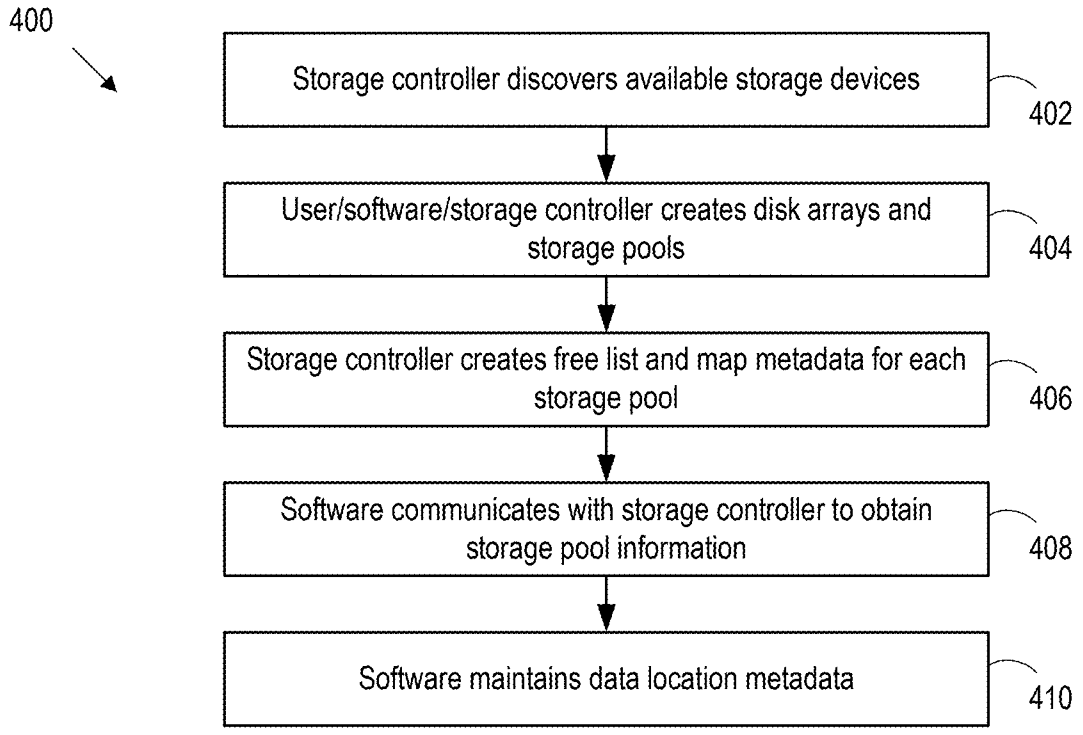
FIG. 4 is a flow diagram depicting a method of initializing a storage controller and software according to some embodiments.

FIG. 4 is a flow diagram depicting a method 400 of initializing storage controller 32 and software 301 according to some embodiments. Method 400 begins at step 402, where storage controller 32 can discover the available storage devices (e.g., local storage devices 29, remote storage devices 12, or both). Discovering storage devices can be identifying storage devices attached to storage controller 32. At step 404, disk arrays can be created and assigned to storage pools. Step 404 can be performed by a user or software interacting with firmware 204 of storage controller 32. Step 404 can be performed by firmware 204 of storage controller 32 autonomously. In some embodiments, pools can be created based on the performance of the underlying disk arrays (e.g., faster, fast, and slow storage pools). Performance of a storage device or disk array may be the efficiency and speed at which data can be stored, retrieved, and manipulated. Each of the pools can have a different performance metric. A performance metric may be a measure of performance. Example measures of performance include read/write speeds, latency, input/output operations per second, data transfer rates, and the like known in the art. A faster pool can have a performance metric, a fast pool can have another performance metric less performant than that of the faster pool, and a slow pool can have another performance metric less performant than that of the fast pool.

At step 406, storage controller 32 can create free lists 303 and maps 302 for the storage pools. At step 408, software 301 can communicate with storage controller 32 to obtain storage pool information (e.g., the types of storage pools and their capacities). At step 410, software 301 can maintain data location metadata 322 for the data objects stored in the storage pools. At step 410, software 40 can create and initialize a data structure for storing data location metadata 322 as such metadata is created.

Figure 5:
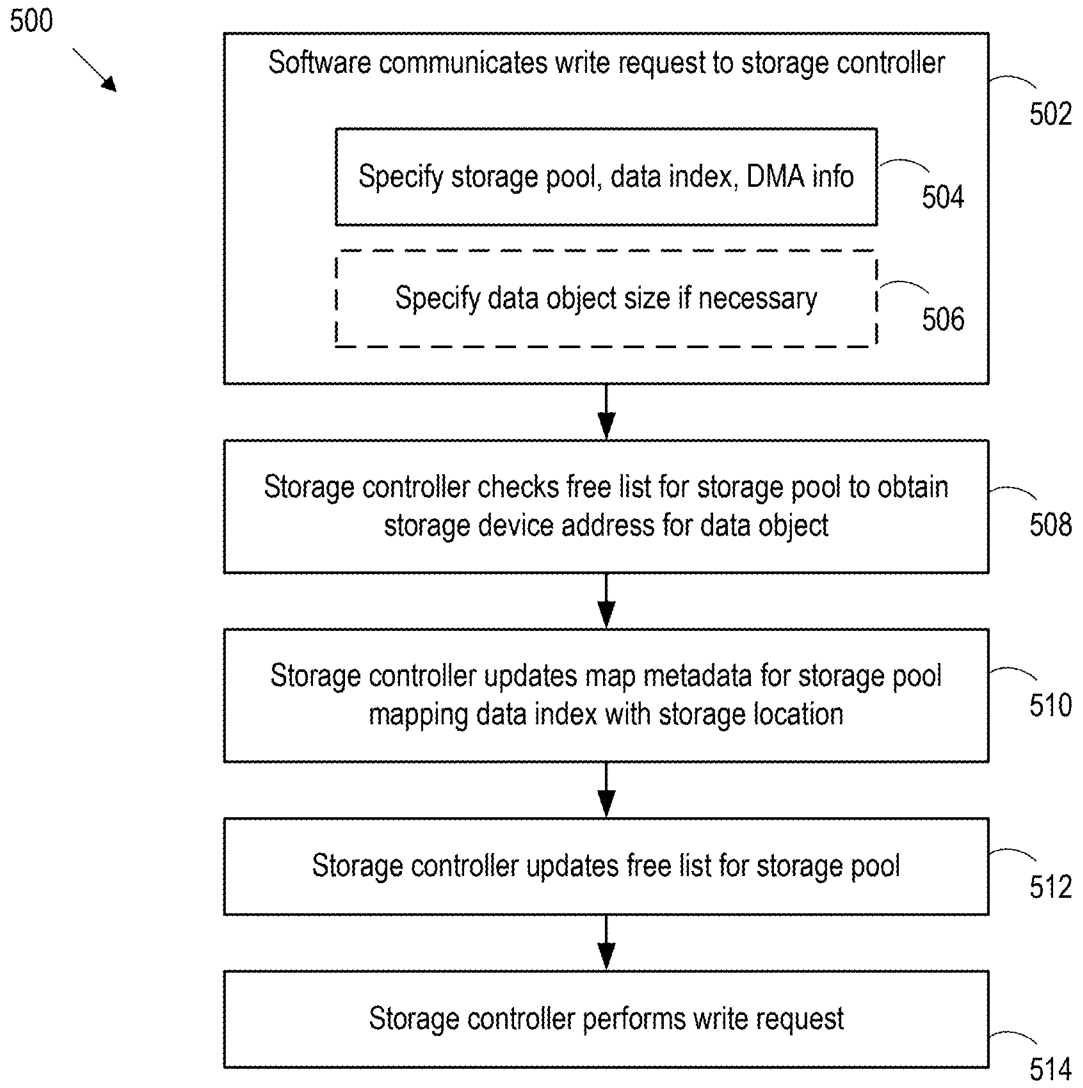
FIG. 5 is a flow diagram depicting a method of writing a data object to secondary storage according to some embodiments.

FIG. 5 is a flow diagram depicting a method 500 of writing a data object to secondary storage according to some embodiments. Method 500 begins at step 502, where software 40 communicates a write request to storage controller 32. In an embodiment, software 301 can specify a storage pool, a data index, and direct memory access (DMA) information for the write request (step 504). The storage pool can identify to which of the storage pools the data object is to be stored (e.g., faster, fast, or slow storage pool). The data index can represent an address in the pool address space. DMA information can include data for obtaining the data object from primary storage (e.g., a scatter-gather list (SGL) or the like). DMA is well known in the art. In some embodiments, software 301 can also specify a size of the data object (step 506) if the standard size is undefined.

At step 508, storage controller 32 can check the free list for the storage pool to obtain an address in the storage device address space for the data object. The address can be defined in terms of a device handle and an LBA. At step 510, storage controller 32 can update the map for the storage pool by mapping the data index in the write request to the storage device address obtained in step 508. The map entry can be data index→(device handle, LBA) in the case of a defined standard size or data index→(device handle, LBA, number of sectors) in case standard size is not defined. The number of sectors can be determined based on the sized specified in the write request.

At step 512, storage controller 32 can update the free list for the storage pool to indicate that the storage device address(es) consumed by the data object are not free. At step 514, storage controller 32 can perform the write request and write the data object to a storage device or array of storage devices as dictated by the array format (e.g., perform a DMA operation to transfer the data object from primary storage to secondary storage).

Figure 6:
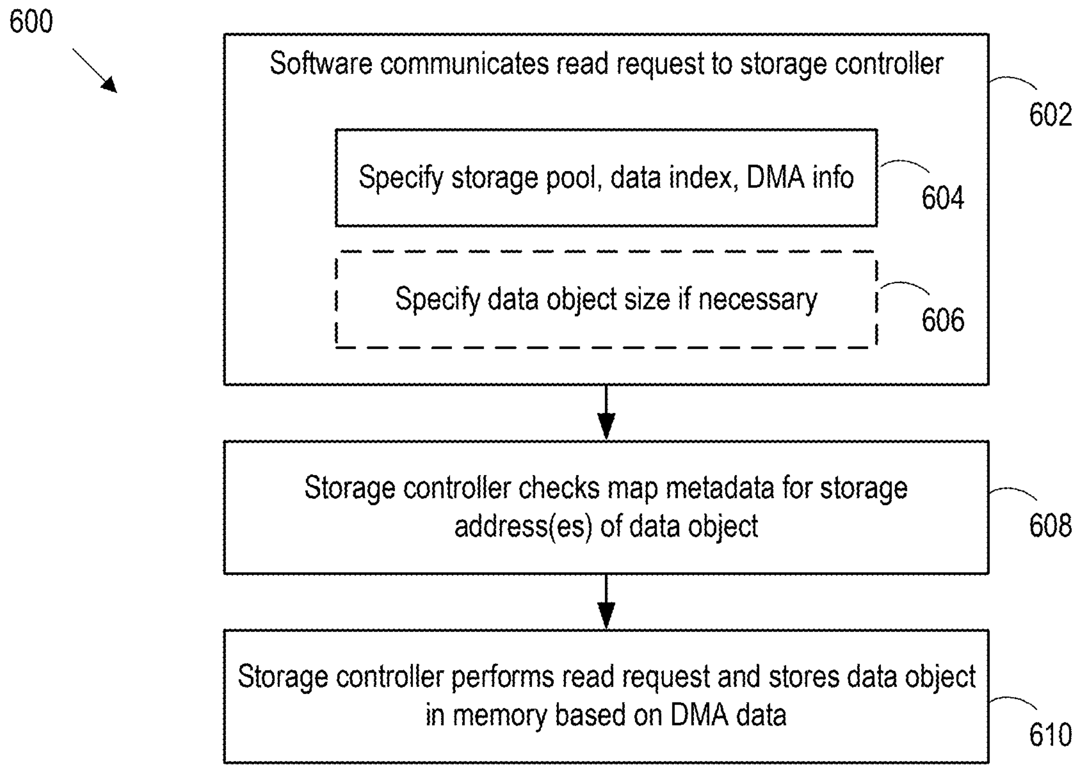
FIG. 6 is a flow diagram depicting a method of reading a data object from secondary storage according to some embodiments.

FIG. 6 is a flow diagram depicting a method 600 of reading a data object according to some embodiments. Method 600 begins at step 602, where software 301 communicates a read request to storage controller 32. In embodiments, software 301 can specify a storage pool, data index, and DMA information for the read request (step 604). The storage pool can identify from which of the storage pools the data object is to be read (e.g., faster, fast, or slow storage pool). The data index can represent an address in the pool address space. DMA information can include data for storing the data object to memory (e.g., an SGL or the like). In some embodiments, software 40 can also specify a size of the data object (step 606) in case the standard size is undefined.

At step 608 storage controller 32 can check the map for the storage pool to obtain storage device address(es) for the data object based on the data index. The storage device address(es) can include the device handle and LBA(s) storing the data object. At step 610, storage controller 32 can perform the read request and store the data object in memory (e.g., RAM or addresses specific in the SGLs) based on the DMA information (e.g., perform a DMA operation to transfer the data object from secondary storage to primary storage).

Figure 7:
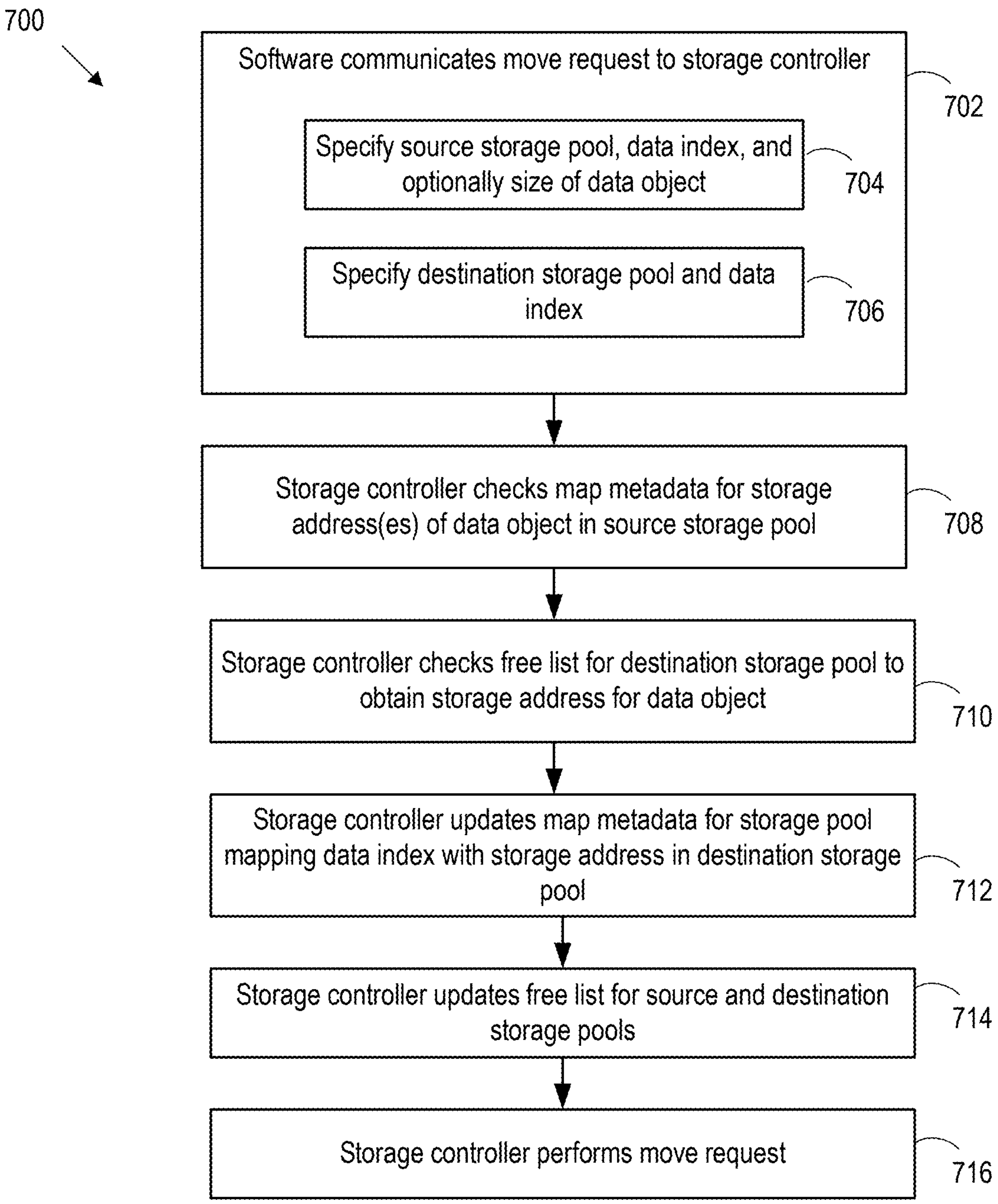
FIG. 7 is a flow diagram depicting a method of moving a data object between a source storage pool and a destination storage pool according to some embodiments.

FIG. 7 is a flow diagram depicting a method 700 of moving a data object between a source storage pool and a destination storage pool according to some embodiments.

Method 700 can be performed to move a data object from faster storage pool to fast or slow storage pool or vice versa, for example. Method 700 begins at step 702, where software 301 can communicate a move request to storage controller 32. Software 301 can specify a source storage pool and data index for the data object (step 704). Optionally, software 301 can specify a size of the data object if standard size is not used. Software 301 can further specify a destination storage pool and data index for the data object (step 706). The move request can be to move the data object from the source storage pool to the destination storage pool.

At step 708, storage controller 32 can check the map for the source storage pool for storage device address(es) of the data object in the source storage pool. The storage device address(es) can include the device handle and LBA(s) for reading the data object. At step 710, storage controller 32 can check the free list for the destination storage pool to obtain a storage device address(es) for the data object. At step 712, storage controller 32 can update the map for the destination storage pool to map the data index of the destination pool to an underlying storage device address. At step 714, storage controller 32 can update the free list for the source storage pool to indicate that the storage device address(es) is/are free. Storage controller 32 can update the free list for the destination storage pool to indicate that the storage device address(es) is/are not free. At step 716, storage controller 32 can perform the move request. A move operation can include reading the data object from the storage device(s) underlying the source pool and writing the data object to storage device(s) underlying the destination pool. The data object can be effectively deleted from the source pool by updating the free list for the source pool.

Data object-based storage controllers have been described. In some embodiments, a computer system can include a hardware platform and software executing on the hardware platform. The hardware platform can include storage devices and a storage controller among other components such as CPU(s), volatile memory, and the like. The software can execute on the hardware platform to perform various functions. The storage controller can communicate with the software and the storage devices and can perform operations including discovering the storage devices. Discovering storage devices can include electronic signaling between the storage controller and the storage devices to determine the existence of the storage devices and any parameters thereof. The storage controller can create pools of the storage devices. Software executing on a CPU can obtain information describing the pools from the storage controller. The software can cooperate with the storage controller to determine an address space each of the pools. The software can communicate with the storage controller to execute a storage transaction. The storage transaction can reference a first pool of the pools and a first address in the address space for the first pool. Creating the pools of storage for use by the software can improve the functioning of the computer system and the technology of controlling storage devices. The software can dispense with direct management of the storage devices, saving memory resources, CPU cycles, and the like. The storage controller can control the storage devices and encapsulate the details of accessing such storage devices from the first software.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A computing system, comprising:

a hardware platform including a central processing unit (CPU), volatile memory, and storage devices;

software executing on the hardware platform, the software configured to generate a request for a storage transaction for an object, the software maintaining first metadata having a first address of the object in an address space of a first pool of the storage devices; and a storage controller of the hardware platform, the storage controller configured to discover the storage devices, create pools of the storage devices including the first pool, determine an address space for each of the pools, send information describing the pools and the address space for each of the pools to the software, and execute, in response to the request from the software, the storage transaction with at least one of the storage devices, the storage controller configured to maintain second metadata that maps the address spaces of the pools to address spaces of the storage devices.

2. The computing system of claim 1, wherein the storage controller is configured to communicate with the storage devices to create arrays of the storage devices and assign the arrays to the pools.

3. The computing system of claim 2, wherein the storage controller is configured to create the pools based on performance of the arrays of the storage devices, each of the pools having a different performance metric.

4. The computing system of claim 1, wherein the storage controller is configured to determine a list of free addresses in an address space of the storage devices.

5. The computing system of claim 1, wherein the storage controller is configured to determine, for each pool of the pools, a map of the address space of the pool to an address space of the storage devices.

6. The computing system of claim 1, wherein the request is to write a data object, and wherein the storage controller is configured to determine a second address in an address space of the storage devices, update a map of the address space of the first pool to the address space of the storage devices, write the data object to at least one of the storage devices based on the second address.

7. The computing system of claim 1, wherein the request is to read a data object, and wherein the storage controller is configured to determine a second address in an address space of the storage devices that is mapped to the first address from a map of the address space of the first pool to the address space of the storage devices, and read the data object from at least one of the storage devices based on the second address.

8. The computing system of claim 1, wherein the request is to move a data object, wherein the first pool is a source pool of the pools and the first address is in the address space of the source pool, wherein the request references a destination pool of the pools and a second address in the address space of the destination pool, and wherein the storage controller is configured to:

determine a third address in an address space of the storage devices;

determine a fourth address in the address space of the storage devices that is mapped to the first address from a first map of the address space of the source pool to the address space of the storage devices;

update a second map of the address space of the destination pool to the address space of the storage devices; and move the data object from at least one of the storage devices backing the source pool to at least one of the storage devices backing the destination pool based on the third address.

9. A method of managing input/output (IO) between software and a storage controller in a computing system, the method comprising:

discovering, by the storage controller, storage devices in the computing system;

creating, by the storage controller, pools of the storage devices;

obtaining, by the software, information describing the pools;

determining, by the software in cooperation with the storage controller, an address space for each of the pools;

maintaining, by the software, first metadata having a first address of an object in an address space of a first pool of the pools;

executing, through communication between the software to the storage controller, a storage transaction referencing the first pool of the pools and the first address in the address space for the first pool; and maintaining, by the storage controller, second metadata that maps the address spaces of the pools to address spaces of the storage devices.

10. The method of claim 9, further comprising:

creating, by the storage controller, arrays of the storage devices; and assigning, by the storage controller, the arrays to the pools.

11. The method of claim 10, wherein the pools are created based on performance of the arrays of the storage devices, each of the pools having a different performance metric.

12. The method of claim 9, further comprising:

determining, by the storage controller, a list of free addresses in an address space of the storage devices.

13. The method of claim 9, further comprising:

determining, by the storage controller for each pool of the pools, a map of the address space of the pool to an address space of the storage devices.

14. The method of claim 9, wherein the storage transaction is a request to write a data object, and wherein the method further comprises:

communicating, from the first software to the storage controller, the request to write the data object, the request specifying the first pool of the pools and the first address in the first pool;

determining, by the storage controller, a second address in an address space of the storage devices;

updating, by the storage controller, a map of the address space of the first pool to the address space of the storage devices; and writing, by the storage controller, the data object to at least one of the storage devices based on the second address.

15. The method of claim 9, wherein the storage transaction is a request to read a data object, and wherein the method further comprises:

communicating, from the first software to the storage controller, the request to read the data object, the request specifying the first pool of the pools and the first address in the first pool;

determining, by the storage controller, a second address in an address space of the storage devices that is mapped to the first address from a map of the address space of the first pool to the address space of the storage devices;

reading, by the storage controller, the data object from at least one of the storage devices based on the second address.

16. The method of claim 9, wherein the storage transaction is a request to move a data object, wherein the first pool is a source pool of the pools and the first address is in the address space of the source pool, and wherein the further comprises:

communicating, from the first software to the storage controller, the request to move the data object, the request specifying the source pool, the first address in the address space of the source pool, a destination pool of the pools, and a second address in the address space of the destination pool;

determining, by the storage controller, a third address in an address space of the storage devices;

determining, by the storage controller, a fourth address in the address space of the storage devices that is mapped to the first address from a first map of the address space of the source pool to the address space of the storage devices;

updating, by the storage controller, a second map of the address space of the destination pool to the address space of the storage devices; and moving, by the storage controller, the data object from at least one of the storage devices backing the source pool to at least one of the storage devices backing the destination pool based on the third address.

17. A non-transitory computer readable medium comprising instructions to be executed in a computing device to cause the computing device to carry out a method of managing input/output (IO) between software and a storage controller in a computing system, the method comprising:

discovering, by the storage controller, storage devices in the computing system;

creating, by the storage controller, pools of the storage devices;

obtaining, by the software, information describing the pools;

determining, by the software in cooperation with the storage controller, an address space for each of the pools;

maintaining, by the software, first metadata having a first address of an object in an address space of a first pool of the pools;

executing, through communication between the software to the storage controller, a storage transaction referencing the first pool of the pools and the first address in the address space for the first pool; and maintaining, by the storage controller, second metadata that maps the address spaces of the pools to address spaces of the storage devices.

18. The non-transitory computer readable medium of claim 17, wherein the storage transaction is a request to write a data object, and wherein the method further comprises:

communicating, from the first software to the storage controller, the request to write the data object, the request specifying the first pool of the pools and the first address in the first pool;

determining, by the storage controller, a second address in an address space of the storage devices;

updating, by the storage controller, a map of the address space of the first pool to the address space of the storage devices; and writing, by the storage controller, the data object to at least one of the storage devices based on the second address.

19. The non-transitory computer readable medium of claim 17, wherein the storage transaction is a request to read a data object, and wherein the method further comprises:

communicating, from the first software to the storage controller, the request to read the data object, the request specifying the first pool of the pools and the first address in the first pool;

determining, by the storage controller, a second address in an address space of the storage devices that is mapped to the first address from a map of the address space of the first pool to the address space of the storage devices;

reading, by the storage controller, the data object from at least one of the storage devices based on the second address.

20. The non-transitory computer readable medium of claim 17, wherein the storage transaction is a request to move a data object, wherein the first pool is a source pool of the pools and the first address is in the address space of the source pool, and wherein the further comprises:

communicating, from the first software to the storage controller, the request to move the data object, the request specifying the source pool, the first address in the address space of the source pool, a destination pool of the pools, and a second address in the address space of the destination pool;

determining, by the storage controller, a third address in an address space of the storage devices;

determining, by the storage controller, a fourth address in the address space of the storage devices that is mapped to the first address from a first map of the address space of the source pool to the address space of the storage devices;

updating, by the storage controller, a second map of the address space of the destination pool to the address space of the storage devices; and moving, by the storage controller, the data object from at least one of the storage devices backing the source pool to at least one of the storage devices backing the destination pool based on the third address.

* * * * *